(12) United States Patent
Peter

(10) Patent No.: US 7,055,775 B2
(45) Date of Patent: Jun. 6, 2006

(54) BELT RETRACTOR

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 442 days.

(21) Appl. No.: 09/836,763

(22) Filed: Apr. 17, 2001

(65) Prior Publication Data

US 2001/0030255 A1 Oct. 18, 2001

(30) Foreign Application Priority Data

Apr. 17, 2000 (DE) .......................... 100 18 972

(51) Int. Cl.
*B65H 75/48* (2006.01)

(52) U.S. Cl. .................................. 242/383.1
(58) Field of Classification Search ............... 242/383, 242/383.1, 390.8, 390.9; 280/806, 807
See application file for complete search history.

(56) References Cited

U.S. PATENT DOCUMENTS

| | | | | |
|---|---|---|---|---|
| 3,995,787 A | * | 12/1976 | Takada et al. ........... | 242/383.1 |
| 4,007,802 A | * | 2/1977 | De Rosa .................. | 242/383.1 |
| 4,036,322 A | * | 7/1977 | Takada et al. ........... | 242/383.1 |
| 4,244,600 A | * | 1/1981 | Takada .................... | 242/383.1 |
| 4,261,530 A | * | 4/1981 | Asai et al. ............... | 242/383 |
| 4,741,491 A | * | 5/1988 | Andersson et al. ...... | 242/383 |
| 4,763,853 A | * | 8/1988 | Andersson ............... | 242/383.1 |
| 5,740,979 A | * | 4/1998 | Rohrle .................... | 280/806 |
| 5,775,620 A | * | 7/1998 | Jabusch et al. .......... | 242/383.1 |
| 5,934,596 A | * | 8/1999 | Gorman et al. .......... | 242/383 |
| 6,290,160 B1 | * | 9/2001 | Strobel ................... | 242/383 |

FOREIGN PATENT DOCUMENTS

| | | |
|---|---|---|
| DE | 2809395 | 9/1979 |
| DE | 4018214 | 12/1991 |
| DE | 69013352 | 5/1995 |
| DE | 19602178 | 2/1997 |
| DE | 29717477 | 1/1998 |
| DE | 29908716 | 10/1999 |

OTHER PUBLICATIONS

U.S. Ser. No. 09/573,431, Filed May 16, 2000.

* cited by examiner

*Primary Examiner*—William A. Rivera
(74) *Attorney, Agent, or Firm*—Tarolli, Sundheim, Covell & Tummino L.L.P.

(57) ABSTRACT

The belt retractor for an occupant restraint system has a frame, a belt spool having a pair of flanges and rotatably mounted in the frame and a locking mechanism for selective blocking of the belt spool. A wheel member provided with an external toothing is mounted on one flange of the belt spool. A locking pawl is biased by a spring that engages with the wheel member. During the normal operating state of the belt retractor, the locking pawl is held by means of a solenoid so that it is disengaged from the wheel member.

7 Claims, 2 Drawing Sheets

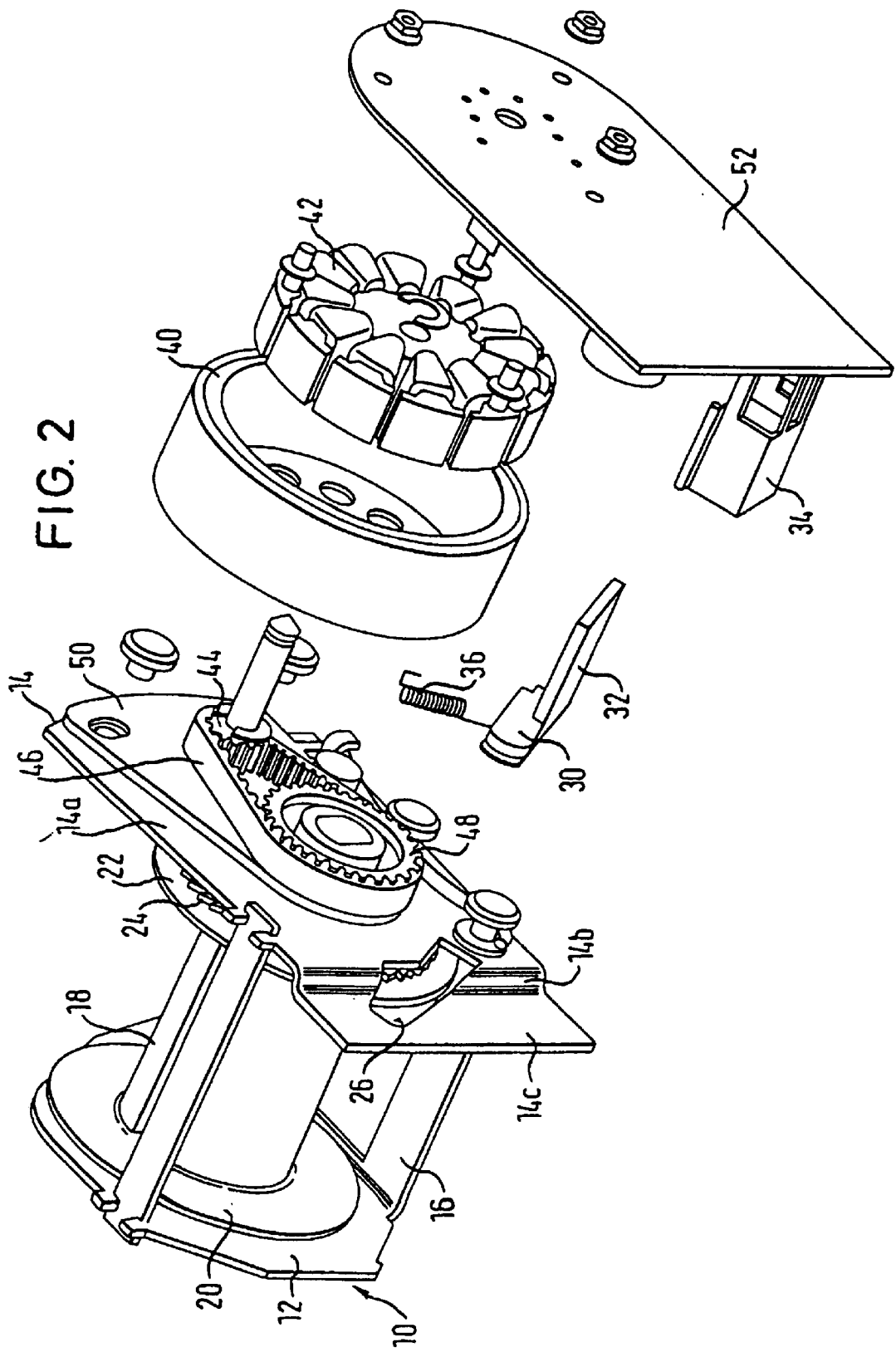

BELT RETRACTOR

FIELD OF INVENTION

The invention relates to a belt retractor for an occupant restraint system, comprising a frame, a belt spool having a pair of flanges and rotatably mounted in the frame, and a locking mechanism for selective blocking of the belt spool.

BACKGROUND OF THE INVENTION

The locking mechanism of a belt retractor that locks in emergency situations is usually activated mechanically. The vehicle-sensitive activation is normally effectuated by an inertia element that causes a pawl to engage with the ratchet of a disk cam which then stops, the relative rotation that then occurs between the belt spool and the disk cam being used to engage a locking pawl into position. With the belt-sensitive actuation, an inertia disk is used that can be rotated relative to the belt spool and that lags behind the rotation of the belt spool in cases of high acceleration of the belt, once again the relative rotation between the inertia disk and the belt spool being used to engage the locking pawl into position.

A short locking path is desirable in locking mechanisms for belt retractors. This can only be achieved with a relatively complicated,and intricate mechanism.

BRIEF SUMMARY OF THE INVENTION

The belt retractor according to the invention is fitted with a locking mechanism that employs the simplest of mechanical means to ensure a short response time and consequently a short locking path. According to the invention, the locking mechanism comprises an external toothing on at least one of the pair of and a locking pawl pivotally mounted on the frame for selective engagement with the external toothing, the locking pawl being biased into an engaged position and capable of being moved by means of a solenoid into an inactive position out of engagement with the external toothing. During normal operation of the belt retractor, the solenoid holds the locking pawl in a position in which it is disengaged from the external toothing on the flange of the belt spool. Suitable means detect an emergency situation that requires activation of the locking mechanism. For this purpose, the solenoid is switched off so that the locking pawl is immediately engaged into the external toothing on the flange of the belt spool. Preferably the bias on the locking pawl in its engaged position exerted by a spring force is assisted by a force of gravity.

In the preferred embodiment, the external toothing is formed on a wheel member on the one flange of the belt spool, the flange extending radially beyond the wheel member and the locking pawl bearing laterally on the flange. Preferably, the locking pawl additionally bears laterally on the frame on a side facing away from the flange of the belt spool. Since the locking pawl bears laterally on both sides, it is only subjected to pressure in case of load, and can be especially easily supported in a recess in one side wall of the frame. An especially advantageous embodiment is one in which the frame has a-side wall with a main section and a parallel wing connected to the main section by a bent wall strip, a bearing recess extending within the wing, through the bent wall strip and into the main section of the side wall, the locking pawl having a rounded end pivotally accommodated in the bearing recess.

The combination with an electric drive for the belt spool is especially advantageous. The electric drive replaces the conventional tensioner spring and can also effectuate a pretensioning in case of an imminent collision. With a suitable sensor system and a drive control with microprocessor technology can control numerous functions of the tensioner that can only be achieved with complicated mechanisms in the case of conventional retractors. These include especially the actuation of the locking mechanism which, in the belt retractor according to the invention, only requires a signal to activate or deactivate the solenoid.

Thus, the subject matter of the invention is also a process to activate the locking mechanism in a belt retractor of the described type. The process consists in that the rotation of the belt spool is detected, in that an actuation signal is generated at a rotational acceleration or rotational speed of the belt spool that exceeds a predefined value, and in that this actuation signal switches off the solenoid. When, the belt retractor is in normal use, the solenoid holds the locking pawl in a position in which it is disengaged from the external toothing of the wheel member. In order to minimize power consumption, the actuation signal for the solenoid is pulse-width modulated. The rotation of the belt spool can be detected magnetically or optically. Especially advantageous embodiments are those with Hall sensors that can be mounted on a printed circuit board together with the motor controlling circuitry. The printed circuit board; preferably also holds the solenoid that controls the locking pawl.

BRIEF DESCRIPTION OF THE DRAWINGS

Additional advantages and characteristics of the invention are found in the description below of an embodiment of the belt retractor and in the appended drawings. The drawings show the following:

FIG. 2 an exploded view of the belt retractor.

DETAILED DESCRIPTION OF THE INVENTION

Figure 1:
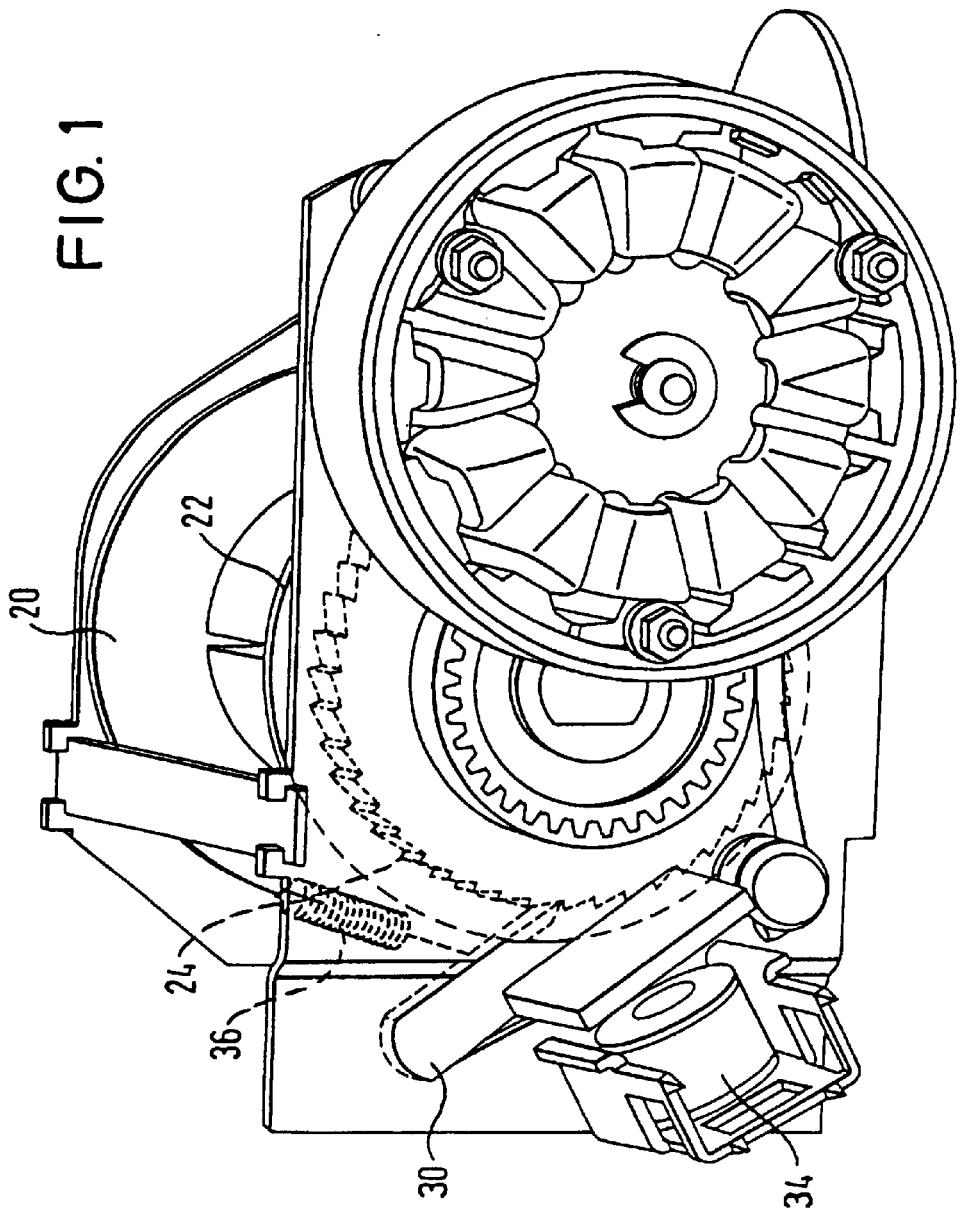
FIG. 1 a schematic perspective view of the belt retractor.

The belt retractor has a frame 10 with two parallel side walls 12, 14 that are connected to each other with cross-pieces 16. A belt spool 18 is rotatably mounted in the frame 10. The belt spool has a pair of flanges 20, 22. A wheel member 24 provided with an external toothing is mounted on the flange 22. The flange 22 has a larger outer diameter than the wheel member 24 and consequently extends radially beyond the wheel member 24.

The side wall 14 of the frame 10 has a main section 14a and a parallel offset wing 14c connected to the main section by a bent wall strip 14b. An oblong bearing recess 26 extends within the wing 14c, through the bent wall into the main section 14a of the side wall 14. A locking pawl is inserted into this bearing recess 26. The locking pawl 30 has a tip for engaging in the external toothing of the wheel member 24 and, across from the tip, it has a rounded end pivotally accommodated in said bearing recess 26. In the installed state, the locking pawl 30 is supported on one of its sides by the flange 22 and on its opposite side by the main section 14a of the side wall 14. It lies in a common plane with the wheel member 24 and the wing 14c in which the supporting end of the bearing recess 26 is located.

The locking pawl 30 is rigidly connected to a laterally extending armature plate 32 of ferromagnetic material. A solenoid 34 interacts with the armature plate 32. The locking pawl 30 is stressed by a tension spring 36 in such a way that it is engaged into the external toothing of the wheel member 24. The engaging movement of the locking pawl 30 is additionally assisted by the force of gravity. Consequently, when the solenoid 34 is in the resting state, the locking pawl 30 is engaged with the wheel member 24 so that the belt spool 18 is blocked. In the normal operation of the belt retractor, the solenoid 34 is activated so that the armature plate 32 lies against the core of the solenoid 34 and the locking pawl 30 is held so that it is disengaged from the external toothing of the wheel member 24.

The belt retractor has an electric drive for the belt spool. This electric drive consists of a brushless direct-current motor with an outer rotor 40 and an inner stator 42, whose driving pinion 44 is coupled via a toothed belt 46 to a drive toothed gear wheel 48 on the side of the belt spool 18. The entire drive is mounted on a base plate 50 that is supported on the outside of a side wall 14 in such a way as to pivot to a limited extent. The pivoting motion of the base plate 50 is utilized to exert tension on the toothed belt 46 as a function of the required driving torque. At a low driving torque, the toothed belt 46 is relatively loose so that minor drive losses and no running noises occur. At a high driving torque, especially during the pretensioning that occurs in the case of an imminent collision, the toothed belt 46 is tensioned so that no teeth are skipped.

The drive control for the electric motor is also mounted on the base plate 50, especially in the form of a printed circuit board 52 that also holds the solenoid 34. Since the printed circuit board 52 is also moved during the pivoting motion of the base plate 50, the solenoid 34 likewise moves relative to the locking pawl 30. The path of motion of the solenoid 34, however, is configured in such a way that the core of the electromagnet is spaced from the armature plate 32 a distance that remains essentially unchanged.

Means for detecting the rotation of the belt spool are also mounted on the printed circuit board 52. These means recognizes a sudden rotation of the belt spool on the basis of the rotational acceleration and/or rotational speed in order to actuate the locking mechanism in a belt-sensitive manner. During normal operation of the belt retractor, the solenoid 34 is actuated with a pulse-width modulated signal. In order to activate the locking mechanism, the solenoid 34 is switched off so that the locking pawl 30 is engaged into the external toothing of the wheel member 24, assisted by the spring 36 and by the force of gravity.

What is claimed is:

1. A belt retractor for an occupant restraint system comprising:
   a frame and a belt spool, said belt spool having a pair of flanges and being rotatably mounted in said frame, said belt retractor further comprising a locking mechanism for selective blocking rotation of said belt spool,
   said locking mechanism comprising an external toothing on at least one of said pair of flanges and a locking pawl pivotally mounted on said frame for selective engagement with said external toothing,
   said external toothing being formed on a wheel member on said one flange of said belt spool, said flange extending radially beyond said wheel member, said locking pawl bearing laterally both on said flange and on said frame on a side of said pawl facing away from said flange of said belt spool, and
   said locking pawl being biased into an engaged position and being movable by means of a solenoid into an inactive position out of engagement with said external toothing.

2. The belt retractor according to claim 1, wherein a laterally projecting armature plate of ferromagnetic material is rigidly connected to the locking pawl.

3. A belt retractor for an occupant restraint system comprising:
   a frame and a belt spool, said belt spool having a pair of flanges and being rotatably mounted in said frame, said belt retractor further comprising a locking mechanism for selective blocking rotation of said belt spool,
   said locking mechanism comprising an external toothing on at least one of said pair of flanges and a locking pawl pivotally mounted on said frame for selective engagement with said external toothing,
   said external toothing being formed on a wheel member on said one flange of said belt spool, said flange extending radially beyond said wheel member, said locking pawl bearing laterally both on said flange and on said frame on a side of said pawl facing away from said flange of said belt spool, and
   said locking pawl being biased into an engaged position and being movable by means of a solenoid into an inactive position out of engagement with said external toothing,
   said frame having a side wall with a main section and a parallel offset wing connected to the main section by a bent wall strip, a bearing recess extending within said wing through said bent wall strip and into the main section of the side wall, said locking pawl having a rounded end pivotally accommodated in said bearing recess.

4. The belt retractor according to claim 3 wherein said parallel offset wing, said wheel member and said locking pawl lie in a common plane.

5. A belt retractor for an occupant restraint system comprising:
   a frame,
   a belt spool having a pair of flanges and rotatably mounted in said frame, and
   a locking mechanism for selective blocking of said belt spool rotation, said locking mechanism comprising an external toothing on at least one of said pair of flanges and a locking pawl pivotally mounted on said frame for selective engagement with said external toothing, said locking pawl being biased into an engaged position and movable by means of a solenoid into an inactive position out of engagement with said external toothing,
   said belt spool being connected to an electric motor by a toothed belt, the electric motor being mounted on a base plate together with a printed circuit board that holds motor controlling circuitry, said base plate being supported on a side wall of said frame in such a way as to pivot to a limited extent, the toothed belt being set under tension by a pivoting motion of the base plate as a function of driving torque.

6. The belt retractor according to claim 5 wherein said solenoid is also mounted on said printed circuit board.

7. The belt retractor according to claim 6 wherein said locking pawl is spaced from said solenoid a distance that remains essentially unchanged when the base plate is pivoted.

* * * * *